US012668729B2

(12) United States Patent
Zhang et al.

(10) Patent No.: US 12,668,729 B2
(45) Date of Patent: Jun. 30, 2026

(54) PROTECTIVE COLLOID WITH EFFECTIVE PROTECTION OF ATTACHMENT AND METHOD FOR USING THE SAME

(71) Applicant: LUXCASE PRECISION TECHNOLOGY (YANCHENG) CO., LTD., Yancheng City (CN)

(72) Inventors: Hong Zhang, Yancheng City (CN); Heng Zhang, Yancheng City (CN); Jinbao Yan, Yancheng City (CN)

(73) Assignee: LUXCASE PRECISION TECHNOLOGY (YANCHENG) CO., LTD., Yancheng City (CN)

( * ) Notice: Subject to any disclaimer, the term of this patent is extended or adjusted under 35 U.S.C. 154(b) by 510 days.

(21) Appl. No.: 18/272,203

(22) PCT Filed: Mar. 17, 2022

(86) PCT No.: PCT/CN2022/081421
§ 371 (c)(1),
(2) Date: Jul. 13, 2023

(87) PCT Pub. No.: WO2022/194241
PCT Pub. Date: Sep. 22, 2022

(65) Prior Publication Data
US 2024/0084179 A1    Mar. 14, 2024

(30) Foreign Application Priority Data

Mar. 19, 2021    (CN) .......................... 202110296133.8

(51) Int. Cl.
| | |
|---|---|
| *C09J 163/10* | (2006.01) |
| *C08J 9/32* | (2006.01) |
| *C09J 5/08* | (2006.01) |
| *C09J 11/08* | (2006.01) |

(52) U.S. Cl.
CPC .............. *C09J 163/10* (2013.01); *C08J 9/32* (2013.01); *C09J 5/08* (2013.01); *C09J 11/08* (2013.01); *C09J 2400/16* (2013.01)

(58) Field of Classification Search
CPC ... C09J 163/10; C09J 5/08; C09J 11/08; C09J 2400/16; C08L 33/08; C08L 71/02
See application file for complete search history.

(56) References Cited

U.S. PATENT DOCUMENTS

| | | | |
|---|---|---|---|
| 2013/0199732 A1 | 8/2013 | Niwa et al. | |
| 2018/0298238 A1* | 10/2018 | Koma ...................... | C08K 5/29 |

FOREIGN PATENT DOCUMENTS

| | | |
|---|---|---|
| CN | 1566244 A | 1/2005 |
| CN | 203805417 U | 9/2014 |
| CN | 105219339 A | 1/2016 |
| CN | 109536104 A | 3/2019 |
| CN | 110437757 A | 11/2019 |
| CN | 110669453 A | 1/2020 |
| CN | 110669465 A | 1/2020 |
| CN | 111500214 A | 8/2020 |
| CN | 111793449 A | 10/2020 |
| CN | 112322206 A | 2/2021 |
| CN | 113046010 A | 8/2021 |
| JP | 4-292668 A | 10/1992 |
| JP | 2000-505828 A | 5/2000 |
| JP | 2009-120807 A | 6/2009 |
| JP | 2009-120808 A | 6/2009 |
| JP | 2010-149058 A | 7/2010 |
| JP | 2012-92226 A | 5/2012 |

OTHER PUBLICATIONS

CN110669465 machine translation (claims) (Year: 2020).*
CN105219339 machine translation (Year: 2016).*
Office Action for CN 202110296133.8 dated Apr. 18, 2022.
Japanese Office Action for Japanese Application No. 2023-576242, dated Sep. 3, 2024.

* cited by examiner

*Primary Examiner* — Blaine Copenheaver
(74) *Attorney, Agent, or Firm* — Birch, Stewart, Kolasch & Birch, LLP

(57) ABSTRACT

Raw materials constituting a protective colloid includes: UV epoxy-modified acrylate polymer, heat-expandable particles, plasticizer, active monomer and cationic photoinitiator. A weight percent of the UV epoxy-modified acrylate polymer is 40-65%; a weight percentage of the heat-expandable particles is 2-10%; a weight percentage of the plasticizer is 10-15%; a weight percentage of the active monomer is 10-30%; and a weight percent of the cationic photoinitiator is 1-3%. Besides, a method for using the protective colloid is also disclosed.

20 Claims, 3 Drawing Sheets applying a protective colloid on an attachment by dispensing, spraying or brushing     S1 curing the protective colloid in the liquid state through a UV curing process, so that the protective colloid is cured and forms an adhesive force with the attachment; a wavelength of ultraviolet light in the UV curing process is 365 nm, 395 nm or 405 nm     S2

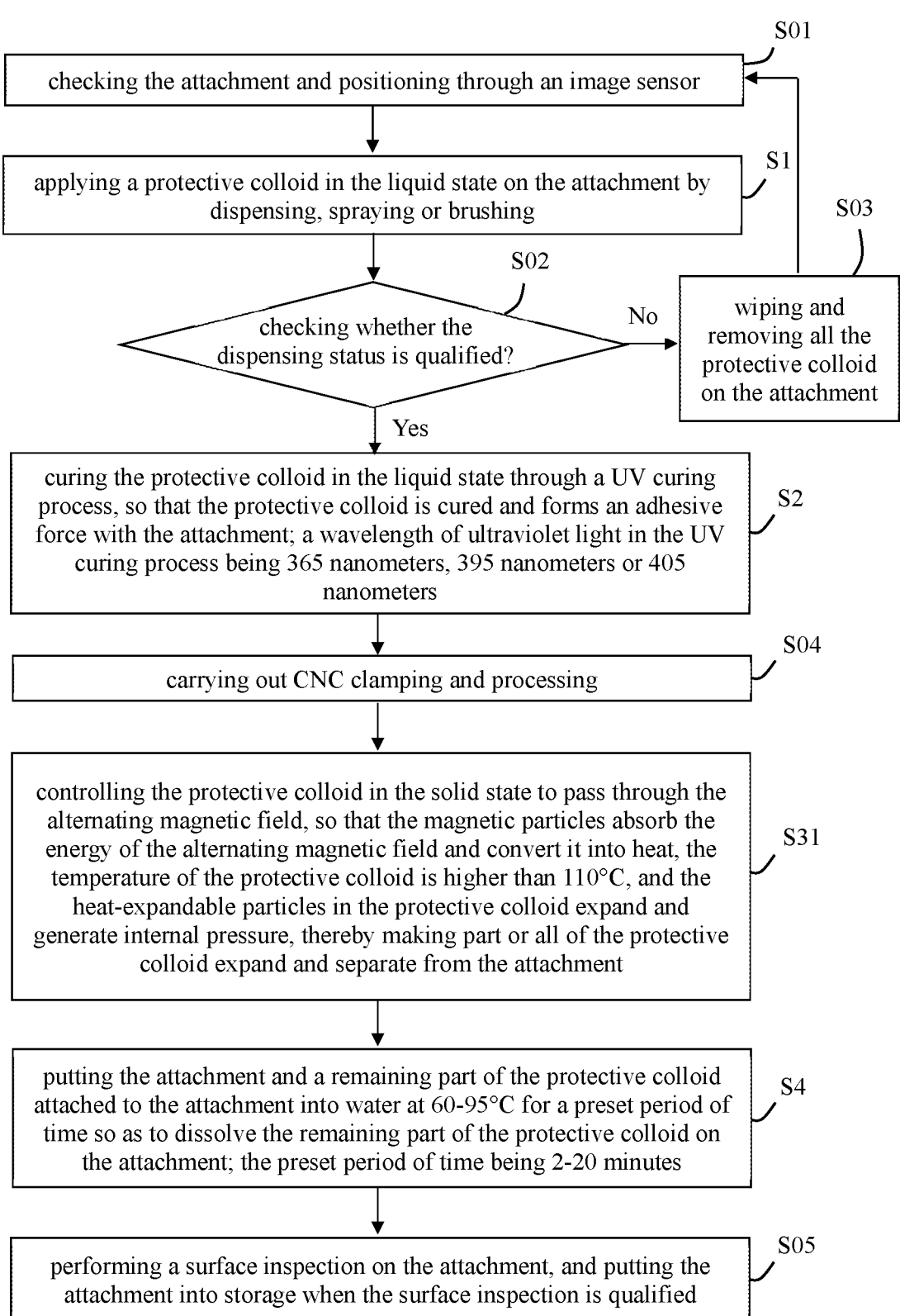

S01 checking the attachment and positioning through an image sensor

S1 applying a protective colloid in the liquid state on the attachment by dispensing, spraying or brushing

S02 checking whether the dispensing status is qualified?

No

S03 wiping and removing all the protective colloid on the attachment

Yes

S2 curing the protective colloid in the liquid state through a UV curing process, so that the protective colloid is cured and forms an adhesive force with the attachment; a wavelength of ultraviolet light in the UV curing process being 365 nanometers, 395 nanometers or 405 nanometers

S04 carrying out CNC clamping and processing

S31 controlling the protective colloid in the solid state to pass through the alternating magnetic field, so that the magnetic particles absorb the energy of the alternating magnetic field and convert it into heat, the temperature of the protective colloid is higher than 110°C, and the heat-expandable particles in the protective colloid expand and generate internal pressure, thereby making part or all of the protective colloid expand and separate from the attachment

S4 putting the attachment and a remaining part of the protective colloid attached to the attachment into water at 60-95°C for a preset period of time so as to dissolve the remaining part of the protective colloid on the attachment; the preset period of time being 2-20 minutes

S05 performing a surface inspection on the attachment, and putting the attachment into storage when the surface inspection is qualified

FIG. 3

PROTECTIVE COLLOID WITH EFFECTIVE PROTECTION OF ATTACHMENT AND METHOD FOR USING THE SAME

CROSS-REFERENCE TO RELATED APPLICATION

This application claims priority of a Chinese Patent Application No. 202110296133.8, filed on Mar. 19, 2021 and titled "PROTECTIVE COLLOID AND METHOD FOR USING THE SAME", the entire content of which is incorporated herein by reference.

TECHNICAL FIELD

The present disclosure relates to a technical field of product processing and manufacturing, in particular to a protective colloid and a method for using the same.

BACKGROUND

In the processing of electronic products, computer numerical control machine tools are usually used for cutting and processing of workpieces.

In the process of processing the workpiece, in order to protect a surface of the workpiece, it is usually necessary to paste a protective film on the surface of the workpiece. In the prior art, the protective film is pasted on the surface of the workpiece with an adhesive. The adhesive is more sensitive to temperature. For example, when the temperature is higher, the viscosity of the adhesive will be reduced, which will easily cause the protective film to separate from the workpiece during processing. In addition, temperature changes during processing, the impact of cutting fluid, and chemical corrosion of the cutting fluid are more likely to cause changes in the properties of the adhesive. This makes it difficult to peel off the protective film, which in turn leads to the formation of a large amount of residual colloid on the surface of the workpiece that cannot be effectively removed. It can be seen that the protective film protecting the workpiece in the prior art has the problems of being unable to effectively protect the workpiece and being difficult to be peeled off.

SUMMARY

An object of the present disclosure is to provide a protective colloid and a method for using the same, which can effectively protect an attachment and be easier to separate from the attachment.

As above design, the technical solution adopted by the present disclosure is:

a protective colloid, raw materials constituting the protective colloid including: UV epoxy-modified acrylate polymer, heat-expandable particles, plasticizer, active monomer and cationic photoinitiator;

wherein a weight percent of the UV epoxy-modified acrylate polymer is 40-65%; a weight percentage of the heat-expandable particles is 2-10%; a weight percentage of the plasticizer is 10-15%; a weight percentage of the active monomer is 10-30%; and a weight percent of the cationic photoinitiator is 1-3%.

Optionally, the heat-expandable particles include an outer shell and a foaming agent inside the outer shell; when the temperature of the cured protective colloid is between 110° C. and 150° C., the foaming agent is heated to vaporize and generate internal pressure; and the outer shell is softened and expanded by heat, so that the protective colloid expands.

Optionally, the raw materials constituting the protective colloid further include magnetic particles, and a weight percentage of the magnetic particles is 2-5%.

Optionally, the magnetic particles include one of iron carbide, ferric oxide, manganese zinc ferrite, nickel zinc ferrite or a combination thereof; and a particle diameter of the magnetic particle is 10-200 nanometers.

Optionally, the raw materials constituting the protective colloid further include a fluorescent agent, and a weight percentage of the fluorescent agent is 0.1-0.5%; the fluorescent agent includes one of a stilbene fluorescent agent, a coumarin-type fluorescent agent, a pyrazoline fluorescent agent, a benzoxazole fluorescent agent, a dicarboximide fluorescent agent or a combination thereof.

Optionally, the plasticizer and the active monomer are water-soluble, and the plasticizer includes one of polyethylene glycol 200, polyethylene glycol 400, polyethylene glycol 600, polyethylene glycol 1000 or a combination thereof the active monomer includes polyethylene glycol acrylate.

Optionally, the cationic photoinitiator includes one of diaryliodonium hexafluorophosphate, mixed liquid triaryl hexafluoroantimonate, 4-(Phenylthio) phenyldiphenylthio-hexafluorophosphate, dihexafluorophosphate (4, 4'-thioeth-ertriphenylsulfonium) 4-isobutylphenyl-4'-methylphenyl iodohexafluorophosphate or a combination thereof.

A method for using a protective colloid includes: a curing step and a separation step:

wherein the curing step includes:

S1, applying the above-mentioned protective colloid on an attachment by dispensing, spraying or brushing; the protective colloid being in a liquid state; and S2, curing the protective colloid in the liquid state through a UV curing process, so that the protective colloid is cured and forms an adhesive force with the attachment; a wavelength of ultraviolet light in the UV curing process is 365 nm, 395 nm or 405 nm;

wherein the separation step includes:

S3, controlling a temperature of the protective colloid to be higher than 110° C., the heat-expandable particles in the protective colloid expanding and generating internal pressure, so that part or all of the protective colloid expands and separates from the attachment; and S4, putting the attachment and a remaining part of the protective colloid attached to the attachment into water at 60-95° C. for a preset period of time so as to dissolve the remaining part of the protective colloid on the attachment; the preset period of time being 2-20 minutes.

Optionally, the raw materials constituting the protective colloid further include magnetic particles; and in step S3, the protective colloid in a solid state is controlled to pass through an alternating magnetic field, so that the magnetic particles absorb energy of the alternating magnetic field and convert it into heat; a power of a magnetic field generator of the alternating magnetic field is greater than or equal to 200 watts; and a frequency of the magnetic field generator is greater than or equal to 300 kilohertz.

Optionally, in step S2, a thickness of the protective colloid in the solid state is 100-200 nanometers; and the protective colloid in the solid state has a material hardness of 75 Shore D or above.

The present disclosure has at least the following beneficial effects:

with regards to the protective colloid and the method for using the protective colloid provided by the present disclosure, the protective colloid has heat-expandable particles. The heat-expandable particles expand when the temperature of the protective colloid is higher than 110° C., which facilitates the separation of the protective colloid and its attachment. When the temperature of the protective colloid is lower than 110° C., the heat-expandable particles do not expand, so the adhesive force between the cured protective colloid and the attachment will not be affected. Furthermore, it is not easy to separate the protective colloid from the attachment during processing, so that the protective colloid can effectively protect the attachment. Moreover, after the UV epoxy-modified acrylate polymer is cured by the UV curing process, it can resist the impact of the cutting fluid, the chemical corrosion of the cutting fluid, etc., so that the properties of the protective colloid are not easy to change. As a result, it reduces the probability of forming residual colloid on the attachment, and facilitates the peeling off of the protective colloid.

BRIEF DESCRIPTION OF DRAWINGS

FIG. 3 is a flow chart when a protective colloid and a method for using the protective colloid provided by the embodiment of the present disclosure are applied to a CNC machining process.

DETAILED DESCRIPTION

Figure 1:
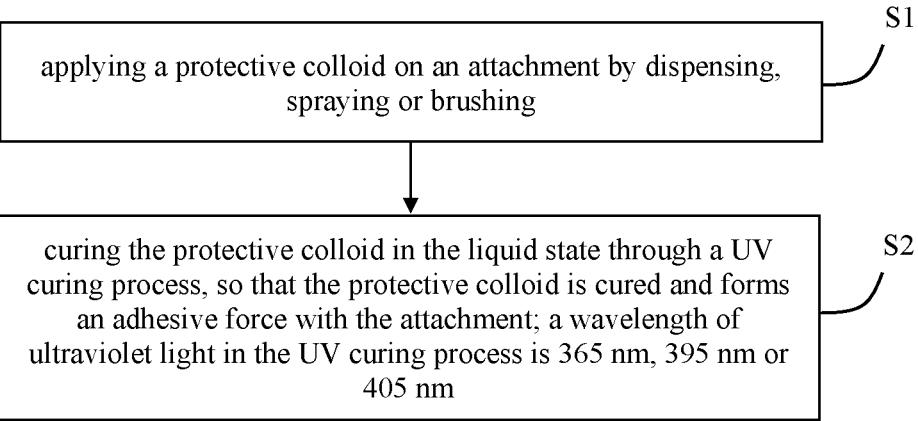
FIG. 1 is a flowchart of a curing step provided by an embodiment of the present disclosure.

In order to make the technical problems solved by the present disclosure, the technical solutions adopted and the technical effects achieved clearer, the technical solutions of the present disclosure will be further described below in conjunction with the accompanying drawings and through specific embodiments. It should be understood that the specific embodiments described here are only used to explain the present disclosure, but not to limit the present disclosure. In addition, it should be noted that, for the convenience of description, only parts related to the present disclosure are shown in the drawings but not all of them.

This embodiment provides a protective colloid that can be used to adhere to a surface of a workpiece (i.e., an attachment) to protect the attachment during the processing of the workpiece. The protective colloid provided in this embodiment is difficult to separate from the attachment during the processing of the attachment; and after the processing of the attachment is completed, it is easier to peel off the attachment.

Raw materials constituting the protective colloid include: UV epoxy-modified acrylate polymer, heat-expandable particles, plasticizer, active monomer and cationic photoinitiator.

Wherein, the UV epoxy-modified acrylate polymer refers to an acrylate polymer after UV epoxy treatment, which has the properties of being modified during a UV curing process. Specifically, the UV epoxy-modified acrylate polymer can be changed from an original liquid state to a solid state after being treated by the UV curing process. In this embodiment, a weight percent of the above-mentioned UV epoxy-modified acrylate polymer is between 50-75%. This embodiment takes 40-65% as an example but does not limit this embodiment of the present disclosure. The UV epoxy-modified acrylate polymer is used as a main component of the protective colloid, so that the protective colloid is able to have the properties of the UV epoxy-modified acrylate polymer. That is, the protective colloid can be cured by the UV curing process to be pasted on the attachment.

A weight percentage of the above-mentioned heat-expandable particles is between 2-20%. This embodiment takes 2-10% as an example but does not limit this embodiment of the present disclosure. The heat-expandable particles have the property of being thermally expanded. Specifically, when the temperature of the protective colloid is higher than 110° C., the heat-expandable particles expand and generate internal pressure, so that the protective colloid expands under the action of the heat-expandable particles, thereby facilitating separation from the attachment. Optionally, a heat stability temperature of the heat-expandable particles is 100° C. That is to say, when the temperature of the protective colloid is lower than 100° C., the heat-expandable particles can remain stable without any abnormality, thereby being able to resist temperature changes during processing. When the temperature of the protective colloid is higher than 100° C. and lower than 110° C., the heat-expandable particles are in an unstable state. Molecules in the heat-expandable particles move, but the volume of the heat-expandable particles does not change, that is, the heat-expandable particles do not expand.

A weight percentage of the above-mentioned plasticizer is between 3-25%. This embodiment takes 10-15% as an example but does not limit this embodiment of the present disclosure. Moreover, the plasticizer has the functions of increasing the compatibility among the raw materials in the protective colloid, increasing the softness of the protective colloid, reducing the tensile strength of the protective colloid, and improving the impact and low temperature performance of the protective colloid.

A weight percentage of the above-mentioned active monomer is between 5-40%. This embodiment takes 10-30% as an example but does not limit this embodiment of the present disclosure. The active monomer has the effect of adjusting the rheology of the protective colloid in the liquid state.

A weight percentage of the above-mentioned cationic photoinitiator is between 0.5-5%. This embodiment takes 1-3% as an example but does not limit this embodiment of the present disclosure. Moreover, the cationic photoinitiator has the function of photoactivating the molecules of the protective colloid to an excited state, and then makes the molecules undergo a series of reactions, and finally produces a super protic acid. The super protic acid can be used as an active species of cationic polymerization to initiate the polymerization of epoxy compounds, vinyl ethers, lactones, acetals, and cyclic ethers, etc.

The protective colloid provided by the embodiment of the present disclosure has the heat-expandable particles. The heat-expandable particles expand when the temperature of the protective colloid is higher than 110° C., which facilitates the separation of the protective colloid and its attachment. When the temperature of the protective colloid is lower than 110° C., the heat-expandable particles do not expand, so the adhesive force between the cured protective colloid and the attachment will not be affected. Furthermore, it is not easy to separate the protective colloid from the attachment during processing, so that the protective colloid can effectively protect the attachment. Moreover, after the UV epoxy-modified acrylate polymer is cured by the UV curing process, it can resist the impact of the cutting fluid, the chemical corrosion of the cutting fluid, etc., so that the properties of the protective colloid are not easy to change. As a result, it reduces the probability of forming residual colloid on the attachment, and facilitates the peeling off of the protective colloid.

Optionally, the heat-expandable particles in this embodiment are thermally rupturable microspheres with a core-shell structure. Exemplarily, the heat-expandable particles include an outer shell and a foaming agent inside the outer shell. The outer shell is spherical and encases the foaming agent. When the temperature of the cured protective colloid is between 110° C. and 150° C., that is, when the temperature of the protective colloid is higher than 110° C. and lower than 150° C., such as 120° C., at this time, the foaming agent in the outer shell is vaporized by heat and generates internal pressure. That is, the foaming agent in this embodiment may be a physical foaming agent, and at the same time, the outer shell is softened by heat and expands with the foaming agent, so that the heat-expandable particles rapidly expand and stretch to become thinner. The protective colloid expands under the action of the internal pressure and external tension of the heat-expandable particles. After the colloid expands, it can reduce the adhesive force on the attachment, thereby facilitating the peeling off of the protective colloid. It can be seen that controlling the temperature of the protective colloid to be lower than 150° C. is able to prevent the properties of the heat-expandable particles from changing.

It should be noted that when the temperature of the protective colloid is between 110° C. and 150° C., the heat-expandable particles start to expand, and the expansion time is less than 5 seconds, so as to improve the efficiency of separating the protective colloid. A ratio of an expanded volume of the heat-expandable particles to an initial volume is less than 300%, so as to prevent the expanded volume of the heat-expandable particles from being too large. Moreover, the heat-expandable particles are evenly distributed in the protective colloid, so as to further facilitate the separation of the protective colloid and the attachment.

In this embodiment, there are many ways to make the temperature of the protective colloid higher than 110° C. Specifically, the raw materials constituting the protective colloid further include magnetic particles. Wherein, a weight percentage of the magnetic particles is 2-5%, and they are used to absorb the energy of an external alternating magnetic field and convert it into heat, so that the temperature of the protective colloid itself increases. Specifically, after the attachment is processed, the attachment and the protective colloid in the solid state can be passed through the external alternating magnetic field. Utilizing the magnetocaloric effect of the magnetic particles in the protective colloid, a large amount of energy in the alternating magnetic field is absorbed through eddy current loss, hysteresis loss, residual loss, etc., and is quickly converted into heat energy, so that the temperature of the protective colloid is rapidly raised to above 110° C. The external alternating magnetic field has a very low influence on the heat effect of the attachment (especially the attachment of metal material), which avoids the influence of the heat source on the attachment, reduces the deformation of the shape and size of the attachment due to heat-expandable and contraction, and ensures the quality of the attachment. It is understandable that the protective colloid and the attachment can also be directly heated by a heating device so that the temperature of the protective colloid is higher than 110° C., which is not limited in this embodiment.

Further, the magnetic particles in this embodiment include one of iron carbide, ferric oxide, manganese zinc ferrite, nickel zinc ferrite or a combination thereof. Due to the material properties, the magnetic particles can effectively produce the magnetocaloric effect, and when the particle size of the magnetic particles is 10-200 nanometers, the magnetic particles are evenly distributed in the protective colloid, so that the temperature at each position of the protective colloid can be increased synchronously.

Optionally, in this embodiment, the raw materials constituting the protective colloid further include a fluorescent agent. Wherein, a weight percentage of fluorescent agent is 0.1-0.5%. Exemplarily, the fluorescent agent is an externally added fluorescent agent. Moreover, the externally added fluorescent agent includes one of a stilbene fluorescent agent, a coumarin-type fluorescent agent, a pyrazoline fluorescent agent, a benzoxazole fluorescent agent, a dicarboximide fluorescent agent or a combination thereof. The fluorescent agent is used to make the protective colloid absorb incident light to generate fluorescence, which is convenient for determining the specific position of the protective colloid and attachments during processing, and can also be used to determine whether the protective colloid has been separated from the attachment during processing.

In this embodiment, both the plasticizer and the active monomer are water-soluble. That is, both the plasticizer and the reactive monomer can dissolve or swell in water. Exemplarily, the plasticizer includes one of polyethylene glycol 200, polyethylene glycol 400, polyethylene glycol 600, polyethylene glycol 1000 or a combination thereof. The active monomer includes polyethylene glycol acrylate.

Optionally, the cationic photoinitiator in this embodiment includes one of diaryliodonium hexafluorophosphate, mixed liquid triaryl hexafluoroantimonate, 4-(Phenylthio) phenyldiphenylthiohexafluorophosphate, dihexafluorophosphate (4, 4'-thioethertriphenylsulfonium) 4-isobutylphenyl-4'-methylphenyl iodohexafluorophosphate or a combination thereof.

The protective colloid provided in this embodiment has a liquid state and a solid state, and the UV curing process is required to change the protective colloid from the liquid state to the solid state. Moreover, when the temperature of the protective colloid exceeds 110° C., it can expand and separate from the attachment. The present disclosure is able to effectively protect the surface of the attachment, and at the same time avoids the contradiction that the protection film in the prior art is difficult to take into account the need to have strong chemical-resistant adhesion during the process of processing, and the low adhesion and easy separation in the process of peeling off after processing. The protective colloid has a simple composition, is suitable for large-scale industrial mass production, has no effect on attachments, and has high stability, high repeatability and low cost.

This embodiment also provides a method for using the protective colloid, which is used for the above-mentioned protective colloid. Wherein, the method for using the protective colloid includes a curing step and a separation step.

Wherein, as shown in FIG. 1, the curing step includes:

S1, applying a protective colloid in the liquid state on an attachment by dispensing, spraying or brushing;

wherein the protective colloid can be applied to the position of the attachment that needs to be protected, and the way of applying the colloid can also include dipping and the like. Since the protective colloid is in the liquid state, compared with the protective film in the prior art, it is easy to apply the protective colloid to special-shaped curved surfaces, complex feature positions or fine structures, so as to realize colloid coating without dead ends and improve the protective effect of the protective colloid.

Optionally, after step S1 is performed, a colloid dispensing state inspection may be performed to determine whether the protective colloid completely covers the position to be protected and whether the protective colloid is evenly distributed; if yes, execute step S2; if not, the protective colloid on the attachment needs to be wiped off and then re-dispensed, re-sprayed or re-brushed.

S2, curing the protective colloid in the liquid state through a UV curing process, so that the protective colloid is cured and forms an adhesive force with the attachment. A wavelength of ultraviolet light in the UV curing process is 365 nanometers, 395 nanometers or 405 nanometers.

Since the protective colloid contains a UV epoxy-modified acrylate polymer, the protective colloid can be quickly cured when UV is irradiated. The UV curing process can form a strong chemical adhesion between the protective colloid and the surface of the attachment. The chemical adhesion can resist the impact and corrosion of cutting fluid in the subsequent process of handling, processing, anodizing temperature and corrosion of chemical liquid, etc., and protect the surface of the attachment from deformation and corrosion impact.

Optionally, in step S2, a thickness of the protective colloid in the solid state is 100-200 nanometers, so as to have a higher protection ability. Moreover, the protective colloid in the solid state has a material hardness of 75 Shore D or above, so that the protective colloid has strong scratch resistance and wiping resistance, and can effectively prevent the attachment from being scratched, wiped or bumped.

Figure 2:
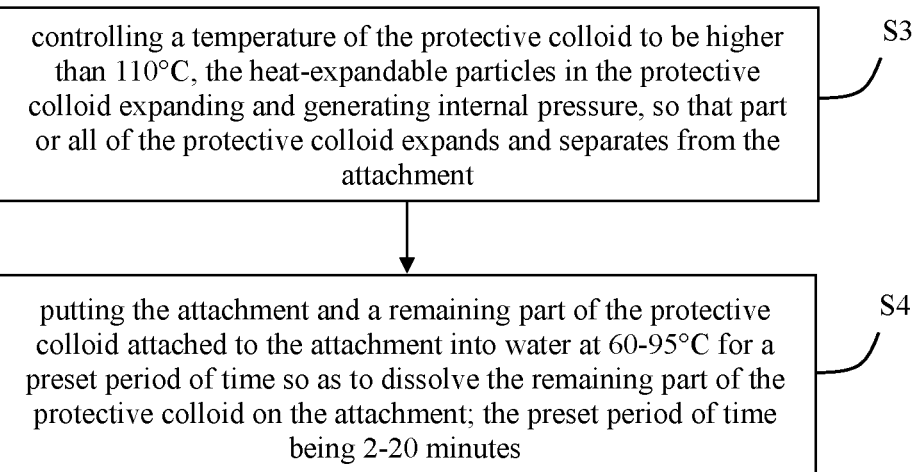
FIG. 2 is a flowchart of a separation step provided by an embodiment of the present disclosure.

As shown in FIG. 2, the separation step includes:

S3, controlling a temperature of the protective colloid to be higher than 110° C., the heat-expandable particles in the protective colloid expanding and generating internal pressure, so that part or all of the protective colloid expands and separates from the attachment;

In step S3, part or all of the protective colloid can be separated from the attachment. At this time, the protective colloid on the attachment can be manually removed, or the attachment can also be placed in water to separate the protective colloid from most or all of the attachment.

S4, putting the attachment and a remaining part of the protective colloid attached to the attachment into water at 60-95° C. for a preset period of time so as to dissolve the remaining part of the protective colloid on the attachment; the preset period of time being 2-20 minutes.

In order to ensure that no residue of protective colloid remains on the attachment, it is necessary to put the attachment into water at 60-95° C., so that the expanded protective colloid overflows from the attachment. At the same time, the fine residue on the surface of the attachment is swelled or dissolved by hot water to ensure that the surface of the attachment is clean. Exemplarily, the attachment can be soaked and rinsed in water to improve the effect of removing the residue.

The method for using the protective colloid provided in this embodiment is simple and easy to operate, and can be applied in various processing processes.

Optionally, the raw materials constituting the protective colloid further include magnetic particles, and step S3 includes:

S31, controlling the protective colloid in the solid state to pass through the alternating magnetic field, so that the magnetic particles absorb the energy of the alternating magnetic field and convert it into heat, the temperature of the protective colloid is higher than 110° C., and the heat-expandable particles in the protective colloid expand and generate internal pressure, thereby making part or all of the protective colloid expand and separate from the attachment.

Wherein the power of the magnetic field generator of the alternating magnetic field is greater than or equal to 200 watts, and the frequency of the magnetic field generator is greater than or equal to 300 kHz, so that the protective colloid can generate enough heat.

When the protective colloid and the method for using the protective colloid provided in this embodiment are applied to the processing technology of a Computer Numerical Control (CNC) machine tool, as shown in FIG. 3, specific processes are as follows:

S01, checking the attachment and positioning through an image sensor;

wherein checking the positioning of the attachment can facilitate subsequent dispensing.

S1, applying a protective colloid in the liquid state on the attachment by dispensing, spraying or brushing;

S02, checking whether the dispensing status is qualified; if yes, execute step S2; if not, execute step S03;

S03, wiping and removing all the protective colloid on the attachment, and execute step S01;

wherein if dispensing is unqualified, it means that the positioning of the attachment is not accurate, resulting in the protective colloid not being located at the position that needs to be protected. Therefore, it is necessary to check the positioning of the attachment and adjust the position of the attachment.

S2, curing the protective colloid in the liquid state through a UV curing process, so that the protective colloid is cured and forms an adhesive force with the attachment. A wavelength of ultraviolet light in the UV curing process is 365 nanometers, 395 nanometers or 405 nanometers;

S04, carrying out CNC clamping and processing;

S31, controlling the protective colloid in the solid state to pass through the alternating magnetic field, so that the magnetic particles absorb the energy of the alternating magnetic field and convert it into heat, the temperature of the protective colloid is higher than 110° C., and the heat-expandable particles in the protective colloid expand and generate internal pressure, thereby making part or all of the protective colloid expand and separate from the attachment;

S4, putting the attachment and a remaining part of the protective colloid attached to the attachment into water at 60-95° C. for a preset period of time so as to dissolve the remaining part of the protective colloid on the attachment; the preset period of time being 2-20 minutes;

S05, performing a surface inspection on the attachment, and putting the attachment into storage when the surface inspection is qualified.

It should be noted that when the surface inspection is unqualified, the film can be removed manually or by related mechanical equipment; and the surface inspection can be carried out after the film is removed to ensure the quality of the attachment and the product.

The above embodiments only illustrate the basic principles and properties of the present disclosure. The present disclosure is not limited by the above-described embodiments. There are various changes and modifications of the present disclosure without departing from the spirit and scope of the present disclosure. These changes and changes are within the scope of the claimed invention. The protection scope of the present disclosure is defined by the appended claims and their equivalents.

What is claimed is:

1. A protective colloid formed from raw materials comprising: UV epoxy-modified acrylate polymer, heat-expandable particles, plasticizer, active monomer and cationic photoinitiator;

wherein a weight percent of the UV epoxy-modified acrylate polymer is 40-65%; a weight percentage of the heat-expandable particles is 2-10%; a weight percentage of the plasticizer is 10-15%; a weight percentage of the active monomer is 10-30%; and a weight percent of the cationic photoinitiator is 1-3%; and wherein the raw materials constituting the protective colloid further comprise a fluorescent agent, and a weight percentage of the fluorescent agent is 0.1-0.5%.

2. The protective colloid according to claim 1, wherein a heat stability temperature of the heat-expandable particles is 100° C., and the heat-expandable particles are evenly distributed in the protective colloid.

3. The protective colloid according to claim 1, wherein the heat-expandable particles comprise an outer shell and a foaming agent inside the outer shell.

4. The protective colloid according to claim 3, wherein the foaming agent is a physical foaming agent.

5. The protective colloid according to claim 1, wherein the raw materials constituting the protective colloid further comprise magnetic particles, and a weight percentage of the magnetic particles is 2-5%.

6. The protective colloid according to claim 5, wherein the magnetic particles comprise one of iron carbide, ferric oxide, manganese zinc ferrite, nickel zinc ferrite or a combination thereof; and a particle diameter of the magnetic particle is 10-200 nanometers.

7. The protective colloid according to claim 1, wherein, the fluorescent agent comprises one of a stilbene fluorescent agent, a coumarin-type fluorescent agent, a pyrazoline fluorescent agent, a benzoxazole fluorescent agent, a dicarboximide fluorescent agent or a combination thereof.

8. The protective colloid according to claim 1, wherein the cationic photoinitiator comprises one of diaryliodonium hexafluorophosphate, mixed liquid triaryl hexafluoroantimonate, 4-(phenylthio) phenyldiphenylthiohexafluorophosphate, dihexafluorophosphate (4, 4'-thioethertriphenylsulfonium) 4-isobutylphenyl-4'-methylphenyl iodohexafluorophosphate or a combination thereof.

9. The protective colloid according to claim 1, wherein the plasticizer and the active monomer are water-soluble, and the plasticizer comprises one of polyethylene glycol 200, polyethylene glycol 400, polyethylene glycol 600, polyethylene glycol 1000 or a combination thereof; the active monomer comprises polyethylene glycol acrylate.

10. A protective colloid formed from raw materials comprising: UV epoxy-modified acrylate polymer, heat-expandable particles, plasticizer, active monomer and cationic photoinitiator;

wherein a weight percent of the UV epoxy-modified acrylate polymer is 40-65%; a weight percentage of the heat-expandable particles is 2-10%; a weight percentage of the plasticizer is 10-15%; a weight percentage of the active monomer is 10-30%; and a weight percent of the cationic photoinitiator is 1-3%; and wherein the plasticizer and the active monomer are water-soluble, and the plasticizer comprises one of polyethylene glycol 200, polyethylene glycol 400, polyethylene glycol 600, polyethylene glycol 1000 or a combination thereof; the active monomer comprises polyethylene glycol acrylate.

11. A method for using a protective colloid, comprising: a curing step and a separation step:

wherein the curing step comprises:

S1, applying a protective colloid on an attachment by dispensing, spraying or brushing; raw materials constituting the protective colloid comprising: UV epoxy-modified acrylate polymer, heat-expandable particles, plasticizer, active monomer and cationic photoinitiator; wherein a weight percent of the UV epoxy-modified acrylate polymer is 40-65%; a weight percentage of the heat-expandable particles is 2-10%; a weight percentage of the plasticizer is 10-15%; a weight percentage of the active monomer is 10-30%; and a weight percent of the cationic photoinitiator is 1-3%; the protective colloid being in a liquid state; and S2, curing the protective colloid in the liquid state through a UV curing process, so that the protective colloid is cured and forms an adhesive force with the attachment; a wavelength of ultraviolet light in the UV curing process is 365 nm, 395 nm or 405 nm;

wherein the separation step comprises:

S3, controlling a temperature of the protective colloid to be higher than 110° C., the heat-expandable particles in the protective colloid expanding and generating internal pressure, so that part or all of the protective colloid expands and separates from the attachment; and S4, putting the attachment and a remaining part of the protective colloid attached to the attachment into water at 60-95° C. for a preset period of time so as to dissolve the remaining part of the protective colloid on the attachment; the preset period of time being 2-20 minutes.

12. The method for using the protective colloid according to claim 11, wherein the raw materials constituting the protective colloid further comprise magnetic particles; and in step S3, the protective colloid in a solid state is controlled to pass through an alternating magnetic field, so that the magnetic particles absorb energy of the alternating magnetic field and convert it into heat; a power of a magnetic field generator of the alternating magnetic field is greater than or equal to 200 watts; and a frequency of the magnetic field generator is greater than or equal to 300 kilohertz.

13. The method for using the protective colloid according to claim 11, wherein, in step S2, a thickness of the protective colloid in the solid state is 100-200 nanometers; and the protective colloid in the solid state has a material hardness of 75 Shore D or above.

14. The method for using the protective colloid according to claim 11, wherein, in step S3, the temperature of the protective colloid is controlled to be higher than 110° C. and lower than 150° C.

15. The method for using the protective colloid according to claim 11, wherein, in step S3, a ratio of an expansion volume of the heat-expandable particles to an initial volume of the heat-expandable particles is less than 300%.

16. The method for using the protective colloid according to claim 11, wherein a heat stability temperature of the heat-expandable particles is 100° C., and the heat-expandable particles are evenly distributed in the protective colloid.

17. The method for using the protective colloid according to claim 11, wherein the heat-expandable particles comprise an outer shell and a foaming agent inside the outer shell; and the foaming agent is a physical foaming agent.

18. The method for using the protective colloid according to claim 11, wherein the raw materials constituting the protective colloid further comprise magnetic particles, and a weight percentage of the magnetic particles is 2-5%; wherein the magnetic particles comprise one of iron carbide, ferric oxide, manganese zinc ferrite, nickel zinc ferrite or a combination thereof; and a particle diameter of the magnetic particle is 10-200 nanometers.

19. The method for using the protective colloid according to claim 11, wherein the raw materials constituting the protective colloid further comprise a fluorescent agent, and a weight percentage of the fluorescent agent is 0.1-0.5%; wherein, the fluorescent agent comprises one of a stilbene fluorescent agent, a coumarin-type fluorescent agent, a pyrazoline fluorescent agent, a benzoxazole fluorescent agent, a dicarboximide fluorescent agent or a combination thereof.

20. The method for using the protective colloid according to claim 11, wherein the plasticizer and the active monomer are water-soluble, and the plasticizer comprises one of polyethylene glycol 200, polyethylene glycol 400, polyethylene glycol 600, polyethylene glycol 1000 or a combination thereof; the active monomer comprises polyethylene glycol acrylate.

\* \* \* \* \*